No. 12,073. REISSUED JAN. 13, 1903.

H. SHOEMAKER.

WIRELESS TELEGRAPHY.

APPLICATION FILED NOV. 8, 1902.

2 SHEETS—SHEET 1.

Witnesses
James M. Sawyer
Alice T. Burrough.

Inventor
Harry Shoemaker
by Cornelius D. Ehret
his Attorney

No. 12,073. REISSUED JAN. 13, 1903.

H. SHOEMAKER.

WIRELESS TELEGRAPHY.

APPLICATION FILED NOV. 8, 1902.

2 SHEETS—SHEET 2.

Witnesses
James M. Sawyer.
Alice T. Burrough.

Inventor
Harry Shoemaker
by Cornelius D. Ehret
his Attorney

UNITED STATES PATENT OFFICE.

HARRY SHOEMAKER, OF PHILADELPHIA, PENNSYLVANIA, ASSIGNOR, BY MESNE ASSIGNMENTS, TO CONSOLIDATED WIRELESS TELEGRAPH AND TELEPHONE COMPANY, A CORPORATION OF ARIZONA TERRITORY.

WIRELESS TELEGRAPHY.

SPECIFICATION forming part of Reissued Letters Patent No. 12,073, dated January 13, 1903.

Original No. 700,250, dated May 20, 1902. Application for reissue filed November 8, 1902. Serial No. 130,615.

*To all whom it may concern:*

Be it known that I, HARRY SHOEMAKER, a citizen of the United States, residing at Philadelphia, in the county of Philadelphia and State of Pennsylvania, have invented a new and useful Improvement in Wireless Telegraphy, of which the following is a specification.

My invention relates to wireless signaling systems, more especially those in which the message is transmitted through the natural media in the form of electroradiant energy.

The object of this invention is the provision of means by which the wave-responsive device is completely protected from the powerful radiations of the transmitting apparatus located at the same station. A single aerial conductor or combination of conductors is employed both for transmitting and receiving.

My invention comprises means whereby the aerial conductor is transferred from the transmitting apparatus to the receiving apparatus, or vice versa, by devices under the control of the operator.

My invention comprises an arrangement of circuits whereby the operator may change the character of the station—that is, from transmitting to receiving, or vice versa—by simply operating a switch.

My invention comprises also an arrangement of circuits whereby the operator may change the character of the station and when changing it to a transmitting-station completely isolates the wave-responsive device of the receiving apparatus, thereby removing all danger due to powerful electroradiations emanating from the transmitting device.

Reference is to be had to the accompanying drawings, in which—

Figure 1:
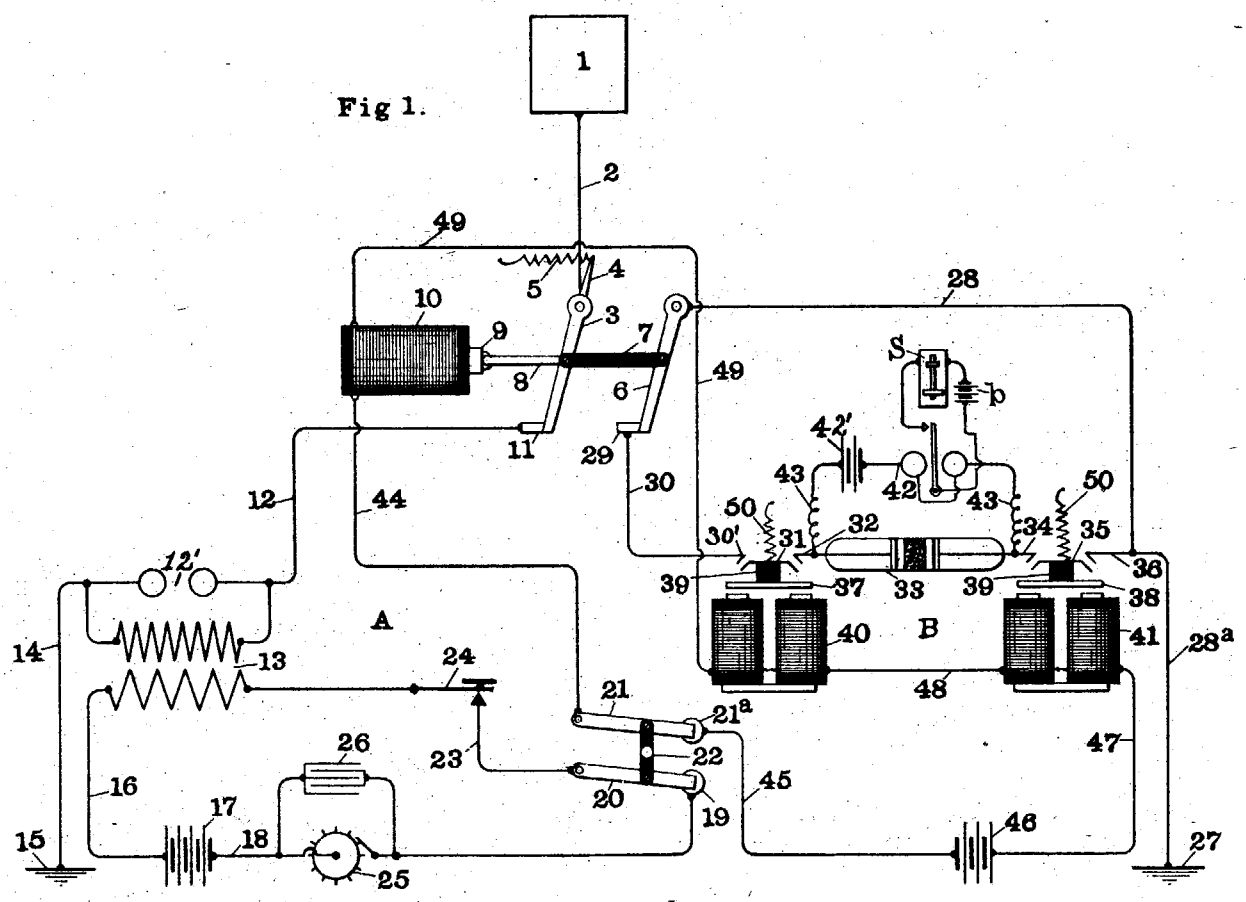
Figure 2:
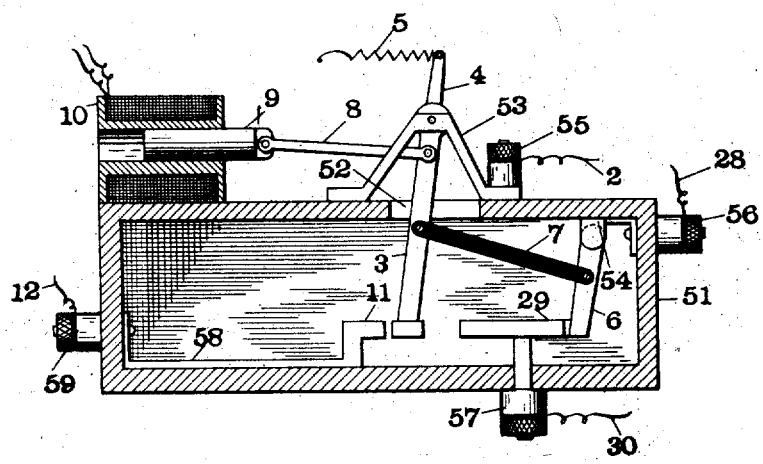
Figure 3:
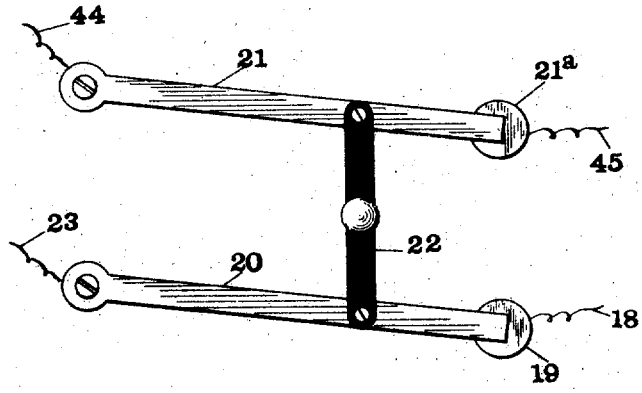

Figure 1 is a diagrammatic view of the circuits of a station of a system, showing both the transmitting and receiving apparatus. Fig. 2 is a view, partly in section, partly in elevation, of the electromagnetic switch for changing the character of the station. Fig. 3 is an enlarged view of the operator's switch.

In Fig. 1, 1 and 2 represent the usual aerial conductor of a wireless signaling system, 1 representing a relatively large capacity area, which may be employed or not, as desired. The conductor 2 connects at its lower end with the switch-blade 3, having an upwardly-extending arm 4. 5 is a spiral spring which is under tension in the position shown in Fig. 1 and tends to move the lower end of No. 3 toward the right. 6 is a second switch-lever similar to 3, 7 being a link of insulating material for causing said members 3 and 6 to operate simultaneously and in the same direction. 8 is a connecting-bar from said switch members 3 and 6 to the core 9 of the solenoid 10. At 11 is shown a contact engageable by the switch-arm 3. 12 is a conductor extending from said contact 11 to one terminal of the spark-gap 12′, whose remaining terminal connects by conductor 14 with the earth connection 15. 13 represents a transformer whose secondary is connected in shunt to the spark-gap 12′ and whose primary is in circuit with the conductor 16, source of energy 17, conductor 18, interrupter 25, contact 19, switch-blade 20, conductor 23, and operator's key 24. In shunt to the interrupter 25 is the usual condenser 26, whose function is that well known in connection with induction coils—namely, to reduce sparking at the contact of the interrupter. The operator's switch comprises the switch-blades 20 and 21, which coöperate, respectively, with the contacts 19 and 21ª. 22 is a link of insulating material, supplied with a handle, by means of which blades 20 and 21 are simultaneously operated. From switch-blade 21 extends the conductor 44, connecting with one terminal of the solenoid 10, whose remaining terminal communicates, by means of conductor 49, with the windings of the electromagnet 40, thence by conductor 48 with the windings of the electromagnet 41, thence by conductor 47 to source of energy 46, thence by conductor 45 with contact 21ª. The lever or switch arm 6 is adapted to engage with the contact 29, which communicates by means of conductor 30 with the contact 30′. 32 is a complementary contact. Contacts 30′ and 32 are engageable by the metallic bridge 31, mounted upon the insulating material 39, which in turn is secured to the armature 37 within the field of the electromagnet 40. 50 is a spring which opposes the attraction of the armature 37 by the electromagnet, or, in other words, which causes the bridge 31 to put the contacts 30′ and 32 into electrical communication upon the deënergization of electromagnet 40. At 34 and 36 are shown a pair of contacts similar to 30′ and 32 and which are engageable by the metallic bridge 35, mounted upon the insulating material 39, which is in turn mounted upon the armature 38 of the electromagnet 41. 50 again represents a spring which causes 35 to bridge the terminals 34 and 36 upon the deënergization of the electromagnet 41. 33 is a wave-responsive device, such as a filings-coherer or any other type, one of whose terminals is joined to the contact 32, while the remaining terminal is joined to the contact 34. In shunt with the wave-responsive device 33 is a local circuit embracing choke-coils 43 43, source of energy 42′, and relay 42. Controlled by the relay 42 is the circuit embracing the source of energy *b* and the sounder or other recording device S. In permanent connection with the switch-arm 6 is the conductor 28, which joins the conductor 28ª, whose lower end connects with the earth at 27. The contact 36 is in electrical communication with conductors 28 and 28ª.

The operation of the system is as follows: With the operator's switch 20 21 in the position shown in Fig. 1 the circuit of the primary of the transformer 13 is closed by the switch-blade 20, and such transformer is therefore under the control of the operator's key 24, the depression of which will cause emission of the electroradiant energy from the circuit 1 2 3 12 12′ 14 15. At the same time the switch-blade 21 is in contact with point 21ª, which therefore causes the energization of solenoid 10 and electromagnets 40 and 41 through the agency of source of energy 46. Therefore when the operator's switch is moved into the position shown the core 9 of solenoid 10 is drawn toward the left, thereby bringing switch-arm 3 into contact with 11 and simultaneously the engagement of switch-arm 6 with contact 29. This motion of switch-arms 3 and 6 is opposed by the spring 5, and the switch-arms remain in the position shown in Fig. 1 so long as solenoid 10 is energized. The energization simultaneous with solenoid 10 of electromagnets 40 and 41 causes the wave-responsive device 33 and its local circuit to be entirely isolated both from conductor 30 and the earth-conductor 28ª. The wave-responsive device 33 remains so isolated so long as electromagnets 40 and 41 continue energized. Though the wave-responsive device is isolated, as just described, to insure its removal from influence from oscillations which might impinge upon conductor 30 or others, the conductor 28 puts said conductor 30 into communication with earth, thereby further protecting the wave-responsive device 33. Accordingly by moving the operator's switch in the position shown in Fig. 1 the aerial conductor is put into communication with the spark-gap of the transmitting-transformer. The primary circuit of such transformer is placed under control of the operator's key. The wave-responsive device of the receiver is isolated, and the connections from the electromagnetic switch to the wave-responsive device are connected directly to earth. When it is desired to change the character of the station from transmitting to receiving, the operator's switch is shifted so as to break connection between 19 and 20 and 21 and 21ª. This results in deënergization of solenoid 10 and the electromagnets 40 41. The deënergization of solenoid 10 releases switch-arms 3 and 6 to the control of spring 5, which then places switch-arm 3 into communication with contact 29 and removes blade 6 from contact with 29. Simultaneous with the deënergization of solenoid 10 electromagnets 40 and 41 release their armatures 37 and 38, respectively, to the control of springs 50 50. This results in the closure of the gaps between contacts 30′ and 32 and 34 and 36 by bridges 31 and 35, respectively. Under these conditions, therefore, the aerial conductor is in communication through switch-arm 3 with the conductor 30. The wave-responsive device 33 is then in series between said conductor and earth. The switch-arm 6 and conductor 28 are idle, and the primary circuit of the transmitting-transformer is opened and beyond the control of the operator's key 24. Upon reception of electroradiant energy on the aerial conductor the wave-responsive device 33 changes its resistance, (greatly lowering it in the case of the filings-coherer,) which change of resistance changes the quantity of current flowing through the windings of the relay 42, this again resulting in the opening or closing of the circuit including the recording device S.

In Fig. 2, 51 represents a casing or box, of insulating material, through the top of which is the perforation or opening 52. Straddling this opening is the bracket 53, on which is pivoted the switch-blade 3, its upper extension 4 coöperating with spring 5, as shown in Fig. 1. Upon the casing 51 is shown in section the solenoid 10, whose core 9 connects with switch-blade 3 by means of rod 8. Within the casing is a bracket 54, in which is pivoted the switch blade or arm 6, mechanically connected to arm 3 by means of the link 7, of insulating material. Contact 11 and contact 29 are mounted upon the bottom of the casing, as clearly shown. Binding-post 55 is mounted upon metallic bracket 53, and in it is secured the aerial conductor 2. The binding-post 56 communicates with the bracket 54 and switch-arm 6, and in it is secured the conductor 28. Binding-post 57 communicates with contact 29, and in it is secured the conductor 30. Binding-post 59, in which is secured conductor 12, communicates by means of 58 with the contact 11.

It is apparent from the disclosure herein that the operator need give his attention only to the switch 20 21 and his transmitting-key 24. Supposing he has been receiving and desires to change the character of his station, so that he may transmit, he merely brings the switch 20 21 into the position shown in Fig. 1, which, without any further attention from the operator, places the transmitting apparatus into communication with the transmitting-conductor and completely isolates the receiver. If, however, he desires to change from transmitting to receiving, he simply opens the switch 20 21, which disconnects the transmitter and prevents any possibility of damage to the receiving apparatus should the key 24 be accidentally depressed. This arrangement greatly facilitates the transmission and reception of messages, because the character of the station may be changed in a very short interval of time—namely, that necessary to operate the switch 20 21. I have, therefore, the first time in the art arranged the transmitting and receiving apparatus in such manner that they can be instantly controlled and with a facility equal to that of telegraphic systems employing metallic conductors between stations.

What I claim is—

1. In a wireless-telegraph system, the combination in a terminal station, of an aerial conductor, a transmitting instrument, a receiving instrument, an electromagnetically-operated and spring-returned means connected to the conductor, and a switch to make a circuit, which energizes the said means to connect the transmitting instrument to the aerial conductor, the spring at other times causing the receiving instrument to be connected to the aerial conductor.

2. A terminal station of a wireless-telegraph system, comprising an aerial conductor, a pair of levers insulated from each other and adapted to swing in unison one being connected to said conductor, means for operating said levers, a transmitting apparatus, a receiving apparatus, and a switch for controlling a circuit to operate said levers to connect the transmitting or the receiving apparatus with the aerial conductor.

3. A terminal station of a wireless-telegraph system comprising an aerial conductor, two independent insulated means adapted to move in unison, one of said means being connected with the aerial conductor, a transmitting apparatus, a receiving apparatus, and means for controlling a circuit to operate said before-mentioned means to connect the transmitting or the receiving apparatus with the aerial conductor.

4. A terminal station of a wireless-telegraph system comprising an aerial conductor, a pair of levers insulated from each other and adapted to swing in unison, one of said levers being connected to the conductor, a transmitting apparatus, a receiving apparatus, and means for controlling a circuit to operate said levers to connect the transmitting or receiving apparatus with the conductor.

5. A terminal station of a wireless-telegraph system comprising an aerial conductor, a pair of pivoted levers connected by insulation, one of said levers being connected to the conductor, a transmitting apparatus, a receiving apparatus, and electromagnetic means for cutting the receiving-station out when the transmitting-station is being operated.

6. A terminal station for a wireless-telegraph system comprising a single aerial conductor, a transmitting instrument, a receiving instrument, means for connecting either one of said instruments to the conductor, means for throwing into operation said first-mentioned means, and another means in circuit with the first-mentioned means operated when the transmitting instrument is connected with the aerial conductor to cut the receiving instrument out.

7. A terminal station for a wireless-telegraph system comprising an aerial conductor, a transmitting apparatus, a receiving apparatus having a coherer, a relay-circuit and a sounder-circuit, electromagnetically-operated means for connecting the aerial conductor with the transmitting or receiving apparatus, another electromagnetically-operated means in the same circuit as the one above mentioned energized when the transmitting apparatus is connected with the conductor for cutting the coherer, relay-circuit and sounder-circuit out, and manually-operated means for causing said electromagnetically-operated means to be energized.

8. A terminal station of a wireless-telegraph system comprising an aerial conductor and two ground conductors, a transmitting apparatus, a receiving apparatus, a pair of levers for connecting the transmitting apparatus or the receiving apparatus to the aerial conductor, a circuit closed when the transmitting apparatus is connected to the aerial conductor, and electromagnetically-operated means for cutting out the receiving apparatus when the transmitting apparatus is connected with the aerial conductor.

9. A terminal station of a wireless-telegraph system comprising an aerial conductor, a transmitting apparatus, a receiving apparatus, a pair of pivoted levers adapted to be operated to connect the transmitting or receiving apparatus to the aerial conductor, a circuit, a solenoid and a pair of electromagnets located in said circuit, a switch for connecting said circuit to energize the solenoid to operate the levers and connect the transmitting apparatus with the aerial conductor, and switch-points operated simultaneously by the electromagnets to cut out the receiving apparatus.

10. In a wireless signaling system, a conductor serving both for transmission and reception of signals, an operator's switch, and electroresponsive means controlled thereby for rendering the receiving apparatus inoperative during transmission of energy from said conductor.

11. In a signaling system, a transmitter and a receiver, a conductor serving to radiate and absorb electroradiant energy, means for putting either the transmitter or receiver into communication with said conductor, electromagnetic means for operating said means, and means for energizing the electromagnetic means when changing the character of the station.

12. In a wireless signaling system, a transmitter, a receiver, a circuit including means for changing the character of the station and an operator's switch having a contact in said circuit.

13. In a wireless signaling system, a transmitter, a receiver, a circuit including means for changing the character of the station and an operator's switch having contacts in said circuit and in the circuit of a signaling-key.

14. In a wireless signaling system, a transmitter, a receiver, a circuit including means for producing electroradiant energy, an operator's switch having a contact in said circuit and an operator's key in said circuit.

15. In a wireless signaling system, a transmitter, a circuit including means for producing electroradiant energy, an operator's switch having a contact in said circuit, and a signaling-key in said circuit.

16. In a wireless signaling system, a radiating-circuit, a transmitter, a circuit including electromagnetic means for putting said transmitter into communication with said radiating-circuit and an operator's switch having a contact in said circuit.

17. In a wireless signaling system, a receiving system, including a wave-responsive device, a circuit including means for isolating the wave-responsive device from the receiving system, and an operator's switch for controlling said circuit.

18. In a wireless signaling system, a receiving system including a wave-responsive device, a circuit including means for isolating both terminals of the wave-responsive device, and an operator's switch having a contact in said circuit.

19. In a wireless signaling system, a receiving-conductor, a receiver, electroresponsive means for removing the receiver from communication with the receiving-conductor, and an operator's switch for controlling said electroresponsive means.

20. In a wireless signaling system, a conductor serving for the radiation and reception of electroradiant energy, a transmitter and receiver associated with said conductor, and electroresponsive means for changing the character of the station by removing a wave-responsive device from communication with said conductor when the transmitter is in operation.

21. In a wireless signaling system, a receiver, an operator's switch, a transmitter, a circuit including means for putting the transmitter into communication with the radiating-conductor, said circuit being controlled by said operator's switch.

22. In a wireless signaling system, a receiving system including a wave-responsive device, a receiving-conductor and an earth connection, electroresponsive means for isolating said wave-responsive device from said receiving-conductor and earth connection, and electroresponsive means for disconnecting the receiving system from the receiving-conductor.

23. In a wireless signaling system, a conductor serving for the transmission and reception of signals, a transmitter and receiver associated with said conductor, an operator's switch, a circuit of means for generating electroradiant energy controlled by said switch, and a circuit including a winding for operating means for connecting and disconnecting the receiver from the influence of said conductor, whereby the character of a station may be changed at will.

HARRY SHOEMAKER.

Witnesses:
ALICE T. BURROUGH,
MAE HOFMANN.